United States Patent [19]

Van Kesteren et al.

[11] Patent Number: 5,726,964
[45] Date of Patent: Mar. 10, 1998

[54] SCANNING HEAD INCLUDING A MAGNETO-OPTICAL ELEMENT AND SCANNING DEVICE INCLUDING THE SCANNING HEAD

[75] Inventors: Hans W. Van Kesteren; Jacobus J. M. Ruigrok, both of Eindhoven, Netherlands

[73] Assignee: U.S. Philips Corporation, New York, N.Y.

[21] Appl. No.: 501,833

[22] Filed: Jul. 13, 1995

[30] Foreign Application Priority Data

Sep. 23, 1994 [EP] European Pat. Off. ............ 94202743

[51] Int. Cl.$^6$ .................... G11B 7/00; G11B 5/127
[52] U.S. Cl. .................... 369/112; 360/125; 360/114; 365/121; 365/122; 365/157
[58] Field of Search .................... 369/112, 110, 369/116, 13, 44.23; 359/245, 246, 251, 252, 254, 258, 255, 280, 281, 282; 365/121, 122, 55, 33, 66, 45, 157; 360/114, 112, 125

[56] References Cited

U.S. PATENT DOCUMENTS

| | | | |
|---|---|---|---|
| 3,239,670 | 3/1966 | Bloemberger | 359/258 |
| 3,725,882 | 4/1973 | Kefalas et al. | 365/55 |
| 4,032,216 | 6/1977 | Henry | 359/280 |
| 4,626,947 | 12/1986 | Narishige et al. | 360/125 |
| 4,631,612 | 12/1986 | Shiiki et al. | 360/125 |
| 4,652,957 | 3/1987 | Schewe et al. | 360/125 |
| 4,675,766 | 6/1987 | Schewe | 360/125 |
| 4,703,382 | 10/1987 | Schewe et al. | 360/125 |
| 4,710,838 | 12/1987 | Jahnke | 360/125 |
| 4,716,484 | 12/1987 | Kaminaka et al. | 360/125 |
| 4,777,553 | 10/1988 | Aoi et al. | 360/114 |
| 5,008,611 | 4/1991 | Ulmer, Jr. | 359/280 |
| 5,239,504 | 8/1993 | Brady et al. | 365/157 |
| 5,287,300 | 2/1994 | Stadler et al. | 365/122 |
| 5,305,137 | 4/1994 | Ohkawara | 359/281 |
| 5,452,122 | 9/1995 | Tsuneda et al. | 359/281 |

FOREIGN PATENT DOCUMENTS

| | | |
|---|---|---|
| 0436424 | 7/1991 | European Pat. Off. . |
| 0472188 | 2/1992 | European Pat. Off. . |

OTHER PUBLICATIONS

IEEE Transactions on Magnetics, vol. Mag 6, No. 3, Sep. 1970, Nicolas et al, pp. 608–610.
Journal of Magnetism and Magnetic Materials 125 (1993), L23–28, Pascard et al.

*Primary Examiner*—Loha Ben
*Attorney, Agent, or Firm*—John C. Fox

[57] ABSTRACT

Scanning head including a magneto-optical element and scanning device including the scanning head. A scanning head having a head face (1) comprises flux-guiding elements (3a, 3b) and a magneto-optical element (5). The magneto-optical element is disposed in a gap plane (4) which extends between flux-guiding elements.

10 Claims, 3 Drawing Sheets

SCANNING HEAD INCLUDING A MAGNETO-OPTICAL ELEMENT AND SCANNING DEVICE INCLUDING THE SCANNING HEAD

BACKGROUND OF THE INVENTION

The invention relates to a scanning head having a head face, which scanning head comprises flux-guiding elements and a magneto-optical element.

The invention further relates to a scanning device comprising a scanning head having a magneto-optical element, a light source, a light path for directing a polarized optical beam generated by the light source to the magneto-optical element, and a detector for measuring a changed of the light beam after reflection from the magneto-optical element.

Such a scanning head and such a scanning device are known from EP-A 0,436,424 (herewith incorporated by reference). The known scanning head has a magneto-optical sensor, particularly a Kerr-effect sensor, and is intended for reading longitudinally recorded information from a magnetic tape. The scanning head further has a magnetic circuit with flux guides, one of the flux guides being used as Kerr-effect sensor. During operation of the scanning device the Kerr-effect sensor is irradiated with an obliquely incident beam of polarized light. After reflection the direction of polarization of the light is rotated owing to the magneto-optical Kerr effect, the Kerr rotation being dependent on the direction of magnetization in the magneto-optical sensor. As a result, the reflected beam contains information corresponding to variations in the direction of magnetization which occur in the sensor and which are caused by varying magnetic flux emanating from the magnetic tape.

In the structure of the known scanning head the Kerr-effect sensor is formed by a layer which is also used as a magnetic flux guide. A disadvantage of this is that the relevant layer should meet stringent magnetic as well as stringent magneto-optical requirements. This demands trade-offs with respect to the choice of the material and thickness of the layer forming both the Kerr-effect sensor and the magnetic flux guide.

The known scanning head utilizes the longitudinal Kerr effect. For this purpose it is required that an incident optical beam makes an angle of approximately 60° with the normal to the Kerr-effect sensor. In order to achieve this without making the angle between the flux guides and the head face undesirably small it is necessary that the beam is reflected from a head-tape surface. A disadvantage of this is that such a surface should be provided with a suitable coating to mitigate the production of noise as a result of head-tape fluctuations, such as distance variations. Another disadvantage of a small angle between the flux guides and the head face is that a comparatively large loss of flux occurs with the same effective gap length.

OBJECTS AND SUMMARY OF THE INVENTION

It is an object of the invention to modify the scanning head defined in the opening paragraph in such a manner that said disadvantages do not occur.

The scanning head in accordance with the invention is characterized in that the magneto-optical element is disposed in a gap plane which extends between flux-guiding elements.

In the scanning head in accordance with the invention two important functions, i.e. guiding of the magnetic flux and detection of flux variations, are separated from one another, so that the two functions can be optimized independently of one another. A significant further advantage of the configuration of flux-guiding elements and transducing element used in the scanning head in accordance with the invention is that during scanning the magnetic flux can be oriented at least substantially perpendicularly to the magneto-optical element, thereby enabling the polar Kerr effect to be used. This effect is several times greater than the longitudinal effect used in the known scanning head.

In the scanning head in accordance with the invention, in which the magneto-optical element extends in accordance with a gap plane situated between the flux-guiding elements, reflection of an optical beam from a head/information-medium surface is not necessary because it is possible to use a light beam, particularly a laser beam, which is incident at least substantially perpendicularly to the magneto-optical element.

The scanning head in accordance with the invention is preferably a thin-film magnetic head, which can be manufactured by means of techniques which are known per se. The magneto-optical element and the flux-guiding elements can be formed as layers on a substrate by means of vacuum-deposition, sputtering and/or other processes.

An embodiment of the scanning head in accordance with the invention is characterized in that a portion of at least one flux-guiding element, which portion is situated opposite the magneto-optical element, is optically transparent. It is to be noted that optically transparent is to be understood to mean that a satisfactory proportion of a light beam which is incident on the optically transparent part of the flux-guiding element is transmitted.

The optically transparent part can be obtained by the use of a thin soft-magnetic metallic layer, preferably of a thickness between approximately 5 and 50 nm. Such a layer, for example of NiFe, CoZrNb or FeNbSi, is semitransparent and therefore very suitable. Another possibility is to use a flux guide of an oxidic material, such as MgZn ferrite, or a garnet. Garnets form a group of materials which are very suitable as flux-guiding elements. They have suitable magnetic and mechanical properties and are sufficiently transparent to light in the long-wave visible and near-infrared range of the spectrum. A suitable material is Co/Si doped ($Y_3Fe_5O_{12}$) described in IEEE Transactions on Magnetics, Vol. Mag. 6, no. 3, Sept. 1970, Nicolas et al, pp 608–610 (herewith incorporated by reference). Other suitable garnets are mentioned, for example, in the Journal of Magnetism and Magnetic Materials 125 (1993), L23–28, Pascard et al (herewith incorporated by reference). As the magneto-optical element it is possible to use, for example, a PtMnSb polycrystalline layer or a Co/Pt multilayer with a great Kerr effect, or a Co ferrite layer with a great Faraday effect.

In the embodiment described above the incident optical beam can be oriented at least substantially perpendicularly to the optically transparent part during operation, so that no reflection from a head-tape or head-disc surface is necessary. In conjunction therewith, it is possible to make the angle between the flux-guiding elements and the head face substantially 90°, which has the advantage that flux losses are minimal for the desired effective gap length.

It is to be noted that EP 0,472,188 (herewith incorporated by reference) describes a magnetic head having a ring-shaped magnetic yoke with a first gap disposed opposite a magnetic recording medium and a second gap disposed opposite to and at a distance from the magnetic recording medium. The second gap is bridged by a perpendicularly magnetizable magneto-optical layer which extends parallel to a main surface of the yoke or along the circumference of the yoke. This layer, which is consequently situated wholly outside the ring-shaped yoke, overlaps two yoke parts bounding the second gap. During scanning the known magnetic head exhibits a stray field or leakage field near the second gap with a magnetic field component which is perpendicular to the surface of the magneto-optical layer. The direction of the component depends on the state of magnetization of the magnetic recording medium. In order to detect a change of the direction of magnetization in the layer, a linearly polarized light beam is projected onto the layer at opposite sides of the second gap, one of the light beams experiencing a first polar Kerr-effect rotation and the other light beam experiencing a second polar Kerr-effect rotation opposed to the first rotation. The change of the direction of magnetization is determined from the difference between the two rotations. A disadvantage of the known magnetic head is that only a part of the magnetic flux guided by the yoke traverses the magneto:optical layer perpendicularly, as a result of which the efficiency is comparatively low. A further disadvantage is that the head configuration is not suitable for simultaneously reading two or more tracks. Moreover, the head structure is unfavourable from a design point of view, in particular, the gaps, which extend transversely of the main surface of the yoke, are difficult to fabricate by means of thin-film techniques.

An embodiment of the scanning head in accordance with the invention is characterized in that the magneto-optical element is in close contact with at least one of said flux-guiding elements. This results in a comparatively large variation of the magnetic flux component which is perpendicular to the magneto-optical element, which is an optimum condition for detection by means of the polar Kerr effect. Preferably, the magneto-optical element is disposed between and in close contact, preferably direct contact, with two flux-guiding elements. In that case demagnetization during scanning is only minimal, so that a maximal change of the perpendicular magnetic component can occur. This is because the close contact minimizes magnetic resistances formed as a result of the presence of spaces between the magneto-optical element and the flux-guiding elements.

An embodiment of the scanning head in accordance with the invention is characterized in that two flux-guiding elements and the magneto-optical element border on the head face. This embodiment, in which the magneto-optical element is disposed between the said two flux-guiding elements, has a high efficiency and, in addition, a high sensitivity is attainable. Another advantage of this embodiment is that a plurality of narrow information tracks can be scanned simultaneously without a special structure of a flux-guiding element being required for this purpose.

If the last-mentioned embodiment has spaces between the magneto-optical element and the flux-guiding elements, the magneto-optical element having an adequate in-plane permeability, the scanning head can be used as a differentiating sensor. The large in-plane variations of the magnetization are now detected, at least substantially, by means of the longitudinal Kerr effect. In the case of similarly directed magnetizations in the parts of the medium to be scanned which face said spaces, the scanning head of this construction can differentiate because the two spaces between the magneto-optical element and the flux-guiding elements produce oppositely directed fluxes through the magneto-optical element.

An embodiment of the scanning head in accordance with the invention is characterized in that two flux-guiding elements border on the head face and the magneto-optical element is disposed at a distance from the head face. In this embodiment, in which the gap plane extends between the said two flux-guiding elements, the magneto-optical element is no longer in mechanical contact with the medium to be scanned during scanning. An advantage of this is that the scanning head is not affected by noise as a result of thermal fluctuations which would arise in the case of contact between a magneto-optical sensor and a scanning medium. A further advantage is that the magneto-optical element is not subject to wear, particularly wear as a result of a recording medium, such as a magnetic tape, which moves past the scanning head.

An embodiment of the scanning head in accordance with the invention is characterized in that a portion of one of the flux-guiding elements which border on the head face, which portion bridges the distance between the head face and the magneto-optical element which is situated at a distance from the head face, has a shape which projects away from the other flux-guiding element which borders on the head face. This embodiment prevents magnetic flux between the head face and the magneto-optical element from crossing over from one flux-guiding element to the other, yielding a higher efficiency.

An embodiment of the scanning head in accordance with the invention is characterized in that the two flux-guiding elements which border on the head face overlap one another only near the magneto-optical element which is situated at a distance from the head face. An important advantage of this embodiment is that all the dimensions of the magneto-optical element can be chosen independently of the width of the transducing or scanning gap. Furthermore, this embodiment has a low susceptibility to wear and keeps a satisfactory efficiency for small track widths. Moreover, the scanning head can be provided with a winding by means of thin-film techniques or conventional techniques.

An embodiment of the scanning head in accordance with the invention is characterized in that two flux-guiding elements border on the head face, the gap plane extending between, on the one hand, the flux-guiding elements which border on the head face, and on the other hand, the flux-guiding element which is situated at a distance from the head face, and the magneto-optical element being disposed opposite a gap which extends between the flux-guiding elements which border on the head face. An advantage of this embodiment is that an optical path without any additional reflection elements can be used because the magneto-optical element extends parallel or at least substantially parallel to the medium to be scanned. In addition, the scanning head provides the possibility of using differential optical detection. A further advantage is the high magnetic efficiency which is attainable. Besides, the scanning head can simply be given a desired azimuth angle by means of lithographic techniques.

An embodiment of the scanning head in accordance with the invention is characterized in that a winding extends between two flux-guiding elements. The winding may comprise one or more write and/or bias turns of, for example, gold or copper. In this respect it is also favourable if one of the flux-guiding elements has a projecting shape away from the other flux-guiding element. The measure in accordance with the invention enables the write function of the scanning head to be integrated simply with the read function without many additional mask steps being required.

The scanning head in accordance with the invention is suitable for the detection of both digital and analog signals and can be used in magnet systems for audio and/or video and/or data recording, both magnetic tapes and magnetic discs being suitable as recording media.

A further object of the invention is to improve the scanning device of the type defined in the introductory part. To this end the scanning device in accordance with the invention comprises, a scanning head having a head face, which scanning head comprises flux-guiding elements and a magneto-optical element, the magneto-optical element being disposed in a gap plane which extends between flux-guiding elements and the scanning device further comprising a light source, a light path for directing a polarized optical beam generated by the light source to the magneto-optical element, and a detector for measuring a change of the light beam after reflection from the magneto-optical element. The scanning head used in the scanning device is the scanning head in accordance with the invention. By scanning the magneto-optical element or an array of magneto-optical elements by means of the light beam or by means of a linear spot formed by the light beam and adapted to cover all the magneto-optical elements of the array it is possible, via the light beam and the detector, to read, process and record the information stored in a large number of tracks of the medium to be scanned. For very narrow tracks this obviates the use of an permissibly large number of interconnections to the electronic processor.

BRIEF DESCRIPTION OF THE DRAWINGS

The invention will now be described in more detail, by way of example, with reference to the drawings, in which.

DETAILED DESCRIPTION OF THE PREFERRED EMBODIMENTS

Figure 1:
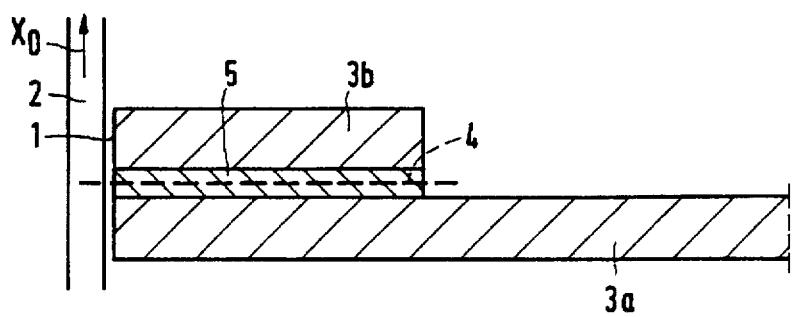
FIG. 1 shows diagrammatically a first embodiment of the scanning head in accordance with the invention.

The scanning head in accordance with the invention shown in FIG. 1 has a contact face or head face 1 for cooperation with an information medium, in the present example a magnetic tape 2, which is movable past the head face 1 in a direction $x_o$. The scanning head comprises a first flux-guiding element 3a and, extending parallel thereto, a second flux-guiding element 3b. The first flux-guiding element 3a may be constructed as a ferrite substrate, for example of an MnZn ferrite or an NiZn ferrite, carrying a thin-film structure which comprises the second flux-guiding element. The second flux-guiding element 3b is optically transparent and in the present example it is made of a garnet, such as Co/Si doped ($Y_3Fe_5O_{12}$). The flux-guiding elements 3a and 3b define a gap plane 4 which extends between the two flux-guiding elements. As a transducing element, the scanning head further comprises a magneto-optical element (MO element) 5, which is oriented transversely of the head face and which extends between the flux-guiding elements 3a and 3b in accordance with the gap plane 4. In the present example the MO element is formed by a Co/Pt multilayer, which is in close contact with the two flux-guiding elements 3a and 3b.

Figure 2:
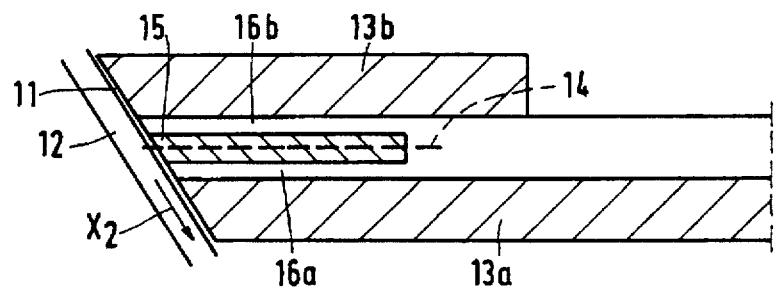
FIG. 2 shows diagrammatically a second embodiment of the scanning head in accordance with the invention.

The scanning head in accordance with the invention shown in FIG. 2 is a thin-film magnetic head having a head face 11 for cooperation with a magnetic tape 12, which is movable in a direction $x_2$. The scanning head comprises a first flux-guiding element 13a, a second flux-guiding element 13b, and a magneto-optical element 15, which extends between the two flux-guiding elements 13a and 13b and which is formed by, for example, an FeNbSi polycrystalline layer having a high implane permeability and an adequate longitudinal Kerr-effect. The flux-guiding elements 13a and 13b and the MO element 15 border on the head face 11. The first flux-guiding element 13a is, for example, a CoZrNb alloy. The second flux-guiding element 13b is, for example, an MrtZn ferrite. Such a ferrite has a satisfactory light transmission and exhibits a small Faraday rotation. Two non-magnetic gap-like spaces 16a and 16b are situated between the MO element 15 and the flux-guiding elements 13a and 13b, respectively, and are filled with, for example, an oxidic material such as aluminum oxide or silicon oxide or a non-magnetizable nitrides such as silicon nitride.

Figure 3:
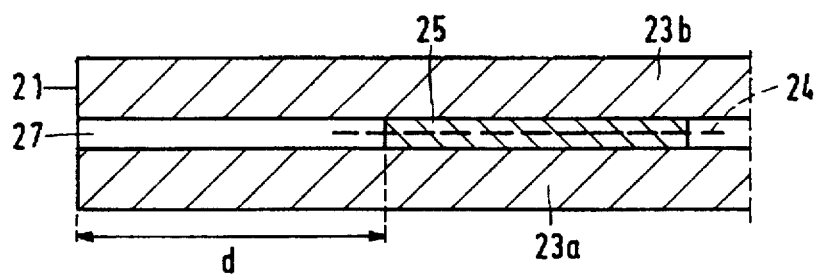
FIG. 3 shows diagrammatically a third embodiment of the scanning head in accordance with the invention.

The scanning head in accordance with the invention shown in FIG. 3 has a head face 21 and comprises two parallel flux-guiding elements 23a and 23b as well as a magneto-optical element 25. The flux-guiding elements 23a and 23b both extend from the head face 21 and define a gap plane 24. The MO element 25 is situated at a distance d from the head face 21, extends in accordance with the gap plane 24 and is in close contact, particularly in direct contact, with both flux-guiding elements 23a and 23b. At least one of the two flux-guiding elements 23a and 23b is optically transparent and is made of a transparent or semitransparent material. The MO element is formed by a layer which exhibits a magneto-optical effect, particularly the polar Kerr effect. Near the head face 21 the flux-guiding elements 23a and 23b bound a non-magnetic scanning or transducing gap 27, which terminates in the head face 21 and is made of, for example, an oxidic material such as zirconium oxide.

Figure 4:
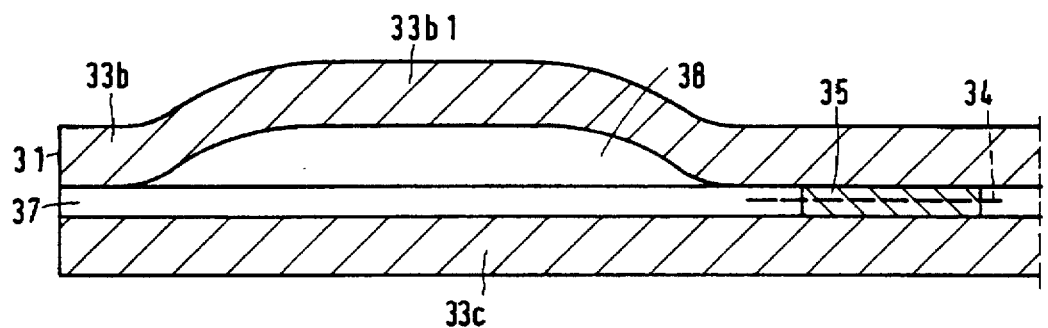
FIG. 4 shows diagrammatically a fourth embodiment of the scanning head in accordance with the invention.

The scanning head in accordance with the invention shown in FIG. 4 comprises two flux guides or flux-guiding elements 33a and 33b, which terminate in a head face 31, and a magneto-optical element 35, which is situated at a distance from the head face 31 and in a gap plane 34 which extends between the flux-guiding elements 33c and 33b. The flux-guiding element 33b has a portion 33b1 which bridges the distance between the head face 31 and the MO element 35 and which has a projecting shape away from the flux-guiding element 33c. Near the head face 31 the flux-guiding elements 33c and 33b bound a non-magnetic transducing gap 37 formed, for example, a silicon oxide insulating layer. A non-magnetic material 38, such as a photoresist, particularly a polymer, is situated between the insulating layer and the projecting portion 33b1.

Figure 5A:
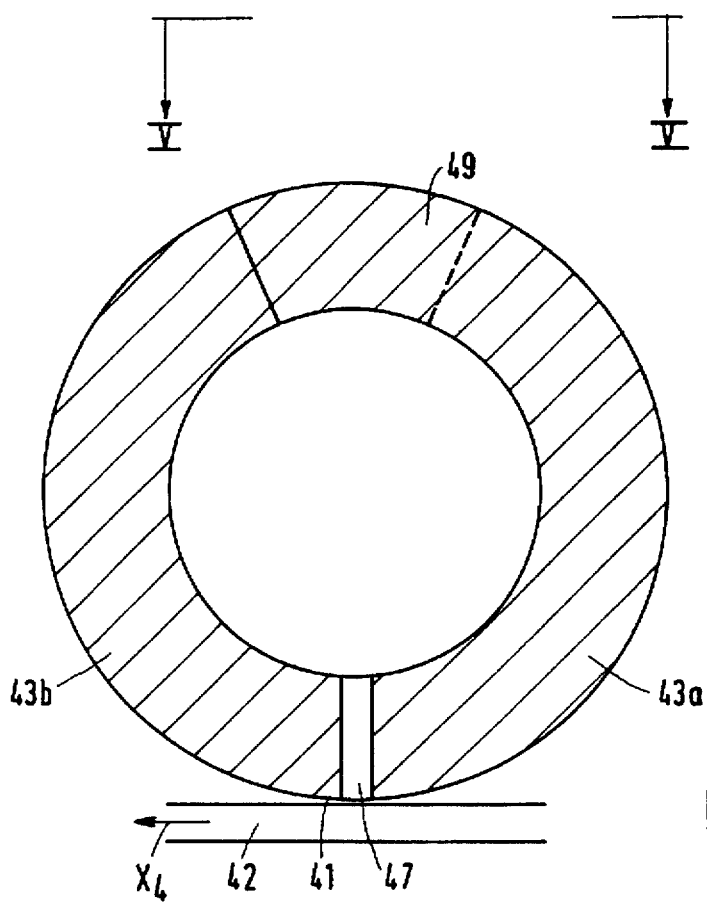
FIG. 5A shows diagrammatically a fifth embodiment of the scanning head in accordance with the invention.
Figure 5B:
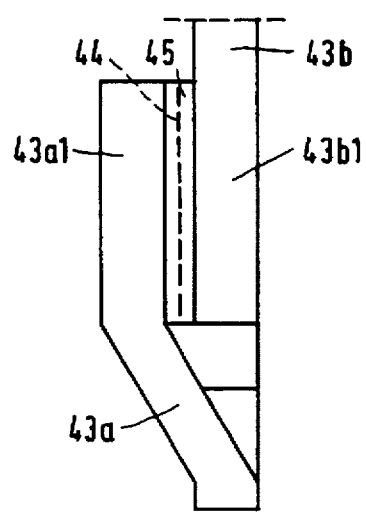
FIG. 5B shows the fifth embodiment in a side view taken on the line V—V.

The scanning head in accordance with the invention shown in FIGS. 5A and 5B has a head face 41 for cooperation with an information medium 42 which is movable past the head face 41 in a direction $x_4$. The scanning head comprises two flux-guiding elements 43a and 43b which border on the head face 41 and which, viewed in a direction transverse to the plane of the drawing, overlap one another exclusively in an area 41 situated at a distance from the head face 41. A gap plane 44, in which a magneto-optical element 45 is situated, extends between the overlapping portions 43a1 and 43b1 of the flux-guiding elements 43a and 43b, the MO element being in close contact with said overlapping portions 43a1 and 43b1. At least one of the portions 43a1 and 43b1 is optically transparent. The flux-guiding elements 43a and 43b bound a non-magnetic transducing gap 47 at the head face 41.

Figure 6:
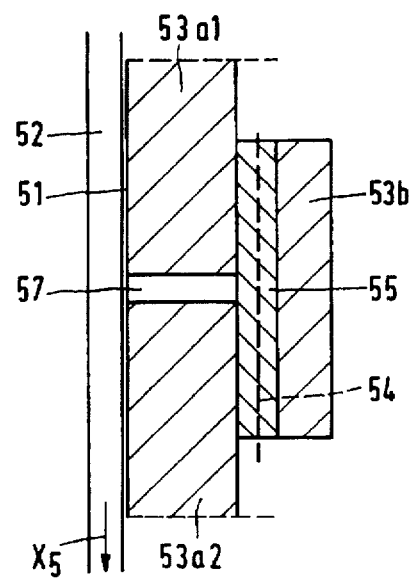
FIG. 6 shows diagrammatically a sixth embodiment of the scanning head in accordance with the invention.

The thin-film scanning head in accordance with the invention shown in FIG. 6 comprises two flux-guiding elements 53a1 and 53a2 which bound a gap 57, particularly a transducing gap, and which form a head face 51. An information medium 52, such as a magnetic disc or tape, is movable past the head face 51 in a direction $x_5$. The scanning head further comprises a further flux-guiding element 53b, which extends at a distance from and parallel to the head face 51. A gap plane 54, in which a magneto-optical element 55 is disposed, extends between, on the one hand, the flux-guiding element elements 53a1 and 53a2 and, on the other hand, the flux-guiding element 53b. Thus, the MO element 55 is sandwiched between, at one side, the flux-guiding elements 53a1 and 53a2 and, at the other side, the flux-guiding element 53b and is consequently disposed opposite the gap 57. The flux-guiding element 53b is optically transparent and is, for example, made of a suitable oxidic material such as MgZn ferrite or a garnet such as Co/Si doped ($Y_3Fe_5O_{12}$).

Figure 7:
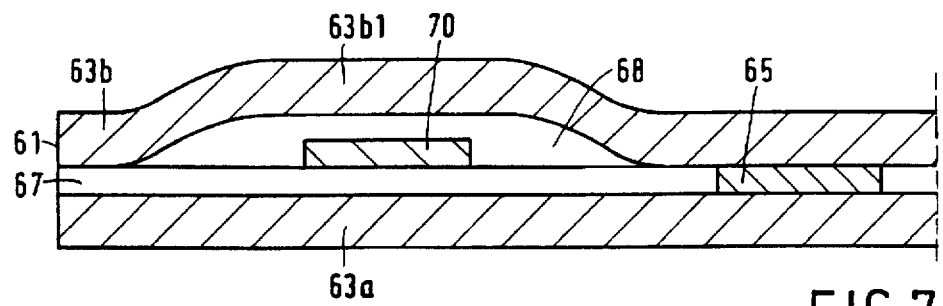
FIG. 7 shows diagrammatically a seventh embodiment of the scanning head in accordance with the invention.

The scanning head in accordance with the invention shown in FIG. 7 has a head face 61 and comprises a first flux-guiding element 63a, a second flux-guiding element 63b, a magneto-optical transducing element 65, and an inductive transducing element 70 in the form of a winding of, for example, gold or copper. Of the two flux-guiding elements 63a and 63b, which both border on the head face 61, the flux-guiding element 63b has an outwardly projecting portion 63b1. The inductive element 70, which comprises one or more disc windings, is interposed between the portion 63b1 and the facing flux-guiding element 63a. The inductive element 70 can be arranged on a thin insulating layer which forms a transducing gap 67 near the head face and can be insulated from the flux-guiding element 63b by an insulating material 68, for example a polymer or an oxide.

Instead of or in addition to the inductive element 70 a bias winding may be provided. The scanning head shown can be manufactured by thin-film techniques known per se, which can be effected starting from the flux-guiding element 63a on which a t-film structure is formed, which structure comprises the MO element 65, the inductive element 70 and the flux-guiding element 63b.

Figure 8:
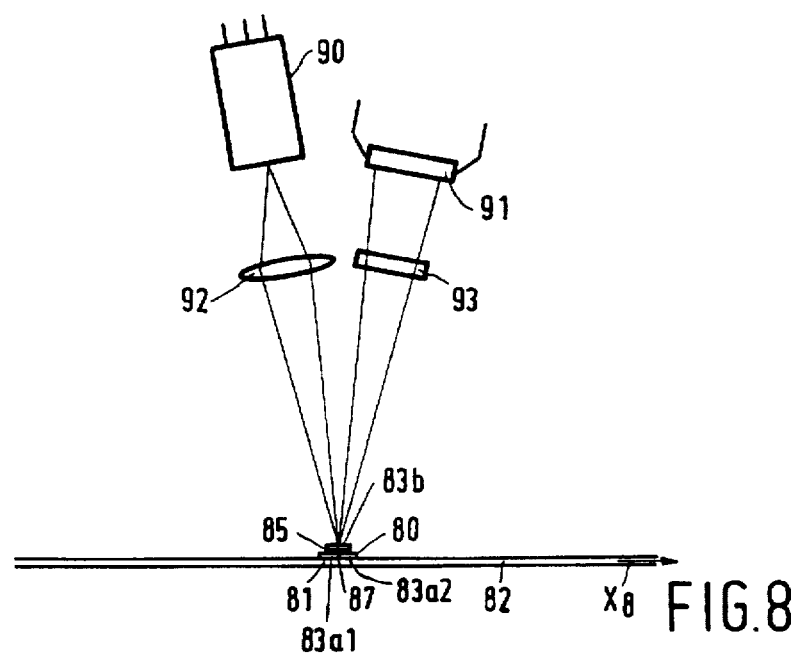
FIG. 8 shows diagrammatically an embodiment of the scanning device in accordance with the invention.

The scanning device in accordance with the invention shown in FIG. 8 comprises a scanning head in accordance with the invention. The scanning head in accordance with the invention, which has been described comprehensively with reference to FIGS. 1 to 7, is shown only diagrammatically in FIG. 8, in which it bears the reference numeral 80. The scanning head 80 shown has a head face 81, past which a magnetic medium 82, in the present example a magnetic tape, is movable in a direction $x_8$. The scanning head 80 comprises a magneto-optical element or sensor 85, which is interposed between, on the one hand, a pair of flux-guiding elements 83a1 and 83a2 spaced by a transducing gap 87 and, on the other hand, an optically transparent flux-guiding element 83b.

The scanning device further comprises a light source 90, particularly a laser unit, a light path and a detector 91. The light path includes a focusing lens 92 for focusing a light beam emitted by the light source 91 onto the MO element 85. The light path may also include a collimator lens and, if the light source is not polarized, a polarizer. During scanning, particularly reading, of the passing information medium 82 an optical beam emitted by the light source is incident on the MO element 85 substantially perpendicularly, a circular or elongate light spot being formed on the MO element 85. After reflection of the optical beam from the MO element 85 the magnetization pattern in the MO element 85 is imaged onto the detector 91, which is arranged behind an analyzer 93. The direction of polarization of the reflected light beam will vary under the influence of the varying magnetization in the passing information medium 82, which produces an intensity variation on the detector 91. The information carried by the information medium 82 can be reproduced, in particular rendered audible or visible, by suitable electronic means, known per se.

It is to be noted that the invention is not limited to the exemplary embodiments disclosed herein. It is, for example, also possible to form a magneto-optical sensor or a transparent flux-guiding element by means of suitable other materials than those mentioned.

We claim:

1. A scanning head having a head face for scanning an information medium for reading information recorded in the information medium, which scanning head comprises a magneto-optical sensor element, and at least two magnetic flux-guiding elements, for guiding magnetic flux from the information medium being scanned through the head face to the magneto-optical sensor element, the flux guiding elements having facing planar surfaces which are spaced apart from one another to form a gap plane which extends therebetween, and the magneto-optical sensor element disposed in the gap plane which extends between the flux-guiding elements, characterized in that the two flux guiding elements border on the head face and the magneto-optical element is situated at a distance from the head face.

2. A scanning head as claimed in claim 1, characterized in that a portion of at least one flux-guiding element, which portion is situated opposite the magneto-optical element, is optically transparent.

3. A scanning head as claimed in claim 2, characterized in that the magneto-optical element is in close contact with flux-guiding element.

4. A scanning head as claimed in claim 2, characterized in that two flux-guiding elements border on the head face, the gap plane extends between the two flux-guiding elements which border on the head face, and a third flux-guiding element which is situated at a distance from the head face, and the magneto-optical element is disposed opposite a gap which extends between the flux-guiding elements which border on the head face.

5. A scanning head as claimed in claim 1, characterized in that the magneto-optical element is in close contact with a flux-guiding element.

6. A scanning head as claimed in claim 1, characterized in that a portion of one of the flux-guiding elements which border on the head face, which portion bridges the distance between the head face and the magneto-optical element which is situated at a distance from the head face, has a shape which projects away from the other flux-guiding element which borders on the head face.

7. A scanning head as claimed in claim 1, characterized in that the two flux-guiding elements which border on the head face overlap one another only near the magneto-optical element which is situated at a distance from the head face.

8. A scanning head as claimed in claim 1, characterized in that two flux-guiding elements border on the head face, the gap plane extends between the flux-guiding elements which border on the head face, and a third flux-guiding element which is situated at a distance from the head face, and the magneto-optical element is disposed opposite a gap which extends between the two flux-guiding elements which border on the head face.

9. A scanning head as claimed in claim 1, characterized in that a winding extends between the at least two flux-guiding elements.

10. A scanning device comprising the scanning head as claimed in claim 1, and further comprising a light source, a light path for directing a polarized optical beam generated by the light source to the magneto-optical element, and a detector for measuring a change of the light beam after reflection from the magneto-optical element.

* * * * *